United States Patent
Mishra et al.

(10) Patent No.: US 9,934,171 B2
(45) Date of Patent: Apr. 3, 2018

(54) SERIAL COMMUNICATION LINK WITH OPTIMAL TRANSFER LATENCY

(71) Applicant: QUALCOMM Incorporated, San Diego, CA (US)

(72) Inventors: Lalan Jee Mishra, San Diego, CA (US); Richard Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 15/040,271

(22) Filed: Feb. 10, 2016

(65) Prior Publication Data

US 2017/0228327 A1    Aug. 10, 2017

(51) Int. Cl.
| | | |
|---|---|---|
| G06F 13/00 | (2006.01) | |
| G06F 13/16 | (2006.01) | |
| G06F 13/42 | (2006.01) | |
| G06F 15/78 | (2006.01) | |
| G06F 13/40 | (2006.01) | |
| G06F 13/12 | (2006.01) | |

(52) U.S. Cl.
CPC .......... *G06F 13/161* (2013.01); *G06F 13/126* (2013.01); *G06F 13/4018* (2013.01); *G06F 13/4282* (2013.01); *G06F 13/4291* (2013.01); *G06F 15/7817* (2013.01)

(58) Field of Classification Search
CPC .. G06F 13/161; G06F 13/126; G06F 12/4018; G06F 21/44
See application file for complete search history.

(56) References Cited

U.S. PATENT DOCUMENTS

| | | | |
|---|---|---|---|
| 6,791,358 B2 | 9/2004 | Dortu et al. | |
| 8,027,359 B2 | 9/2011 | Iwamura | |
| 8,606,982 B2 | 12/2013 | Maldei et al. | |
| 8,989,328 B2 | 3/2015 | Wong | |
| 2006/0143348 A1* | 6/2006 | Wilson | G06F 13/4291 710/110 |
| 2010/0115140 A1 | 5/2010 | Galbo | |
| 2013/0166800 A1 | 6/2013 | Bosse et al. | |
| 2016/0224489 A1* | 8/2016 | Mishra | G06F 13/385 |

FOREIGN PATENT DOCUMENTS

| | | |
|---|---|---|
| EP | 2330514 A1 | 6/2011 |
| WO | WO-2015077803 A1 | 5/2015 |

OTHER PUBLICATIONS

International Search Report and Written Opinion—PCT/US2017/012874—ISA/EPO—dated May 10, 2017.

* cited by examiner

*Primary Examiner* — Tammara R Peyton

(74) *Attorney, Agent, or Firm* — Haynes & Boone, LLP

(57) ABSTRACT

A serial interface is provided with a finite state machine configured to compare a current state for a plurality of signals to a previous state to determine whether to transmit a frame including the plurality of signals or to transmit a frame that includes only a bit position of a changed one of the signals.

20 Claims, 8 Drawing Sheets

| | Latency Ratio | Latency Reduction (%) |
|---|---|---|
| Full-batch Mode 610 | 18/16 | -12.5% |
| Byte Mode 615 | 11/16 | 31.25% |
| Bit Mode 620 | 7/16 | 56.25% |

FIG. 6

SERIAL COMMUNICATION LINK WITH OPTIMAL TRANSFER LATENCY

TECHNICAL FIELD

This application relates to serial communication, and more particularly to a serial communication link with optimal transfer latency.

BACKGROUND

Serial communication interfaces are a common element for an integrated circuit processor such as a system on a chip (SoC). An SoC must serve an ever expanding set of functions such as web browsing, email, video gaming, and so on. To interface with its various peripherals during the execution of these functions requires a certain number of pins or terminals. It would be convenient to assign each input/output signal to its own unique pin but increasing the number of pins for an integrated circuit increases its costs. Moreover, even if cost were no issue, an integrated circuit can only fit so many pins onto its surfaces.

To limit the number of required pins, conventional SoCs typically include have one or more serial communication interfaces such as a universal asynchronous receiver transmitter (UART) interface, an inter-integrated circuit (I2C or I3C) interface, or a serial peripheral interface (SPI). A plurality of signals may then be serialized and transmitted through a corresponding serial interface having a single data pin (or pins) that is shared by the various serialized signals.

Although serial interfaces are thus advantageous, the serialization of signals inherently introduces latency. For example, if a one-bit signal has its own unique pin such as for a general purpose input output (GPIO) signal, the resulting one-bit GPIO signal may be transmitted responsive to a single cycle of a system clock. But if the one-bit GPIO signal is serialized with other GPIO signals into a frame such as an 8-bit frame in a virtual GPIO interface, it takes eight clock cycles to transmit the resulting frame (assuming a single data rate with regard to edges of the clock). The serial transmission in a virtual GPIO system would thus take eight times as long to transmit a GPIO signal as compared to a conventional GPIO transmission. The resulting latency may be critical in time-sensitive applications such as for radio front-end control.

Accordingly, there is a need in the art for reducing the latency inherent to serial interfaces.

SUMMARY

A serial interface is disclosed that serializes a plurality of signals into a frame in which each signal has its own unique position in the frame. For example, an eight-bit frame may be considered to be arranged from a first bit through an eighth bit. A first signal is defined through the binary value of the first bit, a second signal is defined through the binary value of the second bit, and so on such that a signal in a received frame may be identified through its position in the frame. In alternative embodiments, one or more of the signals may comprise a multi-bit signal. But such multi-bit signals are also assigned to unique positions within a frame.

To optimize the latency of the resulting serial transmission of the frame, the serial interface includes a logic circuit such as a processor or state machine configured to compare the current frame to a preceding frame to determine the number of signals within the current frame that have changed their binary state as compared to the previous frame. If the number of changed signal is sufficiently small, the serial interface may transmit what is denoted herein a "bit mode" frame in which the payload merely identifies the bit position of the changed signal(s) and also identifies the binary value of the changed signals. The unchanged bits are not transmitted in a bit-mode frame. For example, the bit-position of a given signal in a byte-long frame may be identified with three bits. If just one bit has changed, the corresponding serial interface may thus transmit a bit-position frame that has a payload of the three bit-position bits to identify the changed signal and also the bit value for the changed signal such that the payload is four bits. In contrast, transmission of the full byte (designated herein as a full-batch mode) requires eight bits. Transmission of the bit-mode frame thus reduces latency as compared to the transmission of the full-batch mode frame. Conversely, if a sufficient number of signals in the current frame have changed state compared to the previous frame, it no longer saves latency to transmit a bit-mode frame such that the full-batch mode frame is transmitted instead of the bit-mode. By dynamically switching between frame types depending upon the number of changed bits in a current frame, the serial interface disclosed herein reduces latency for the resulting serial transmission.

BRIEF DESCRIPTION OF THE DRAWINGS

FIG. 6 illustrates a batch-mode frame, a byte-mode frame, and a bit-mode frame for the transmission of a sixteen-bit signal.

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
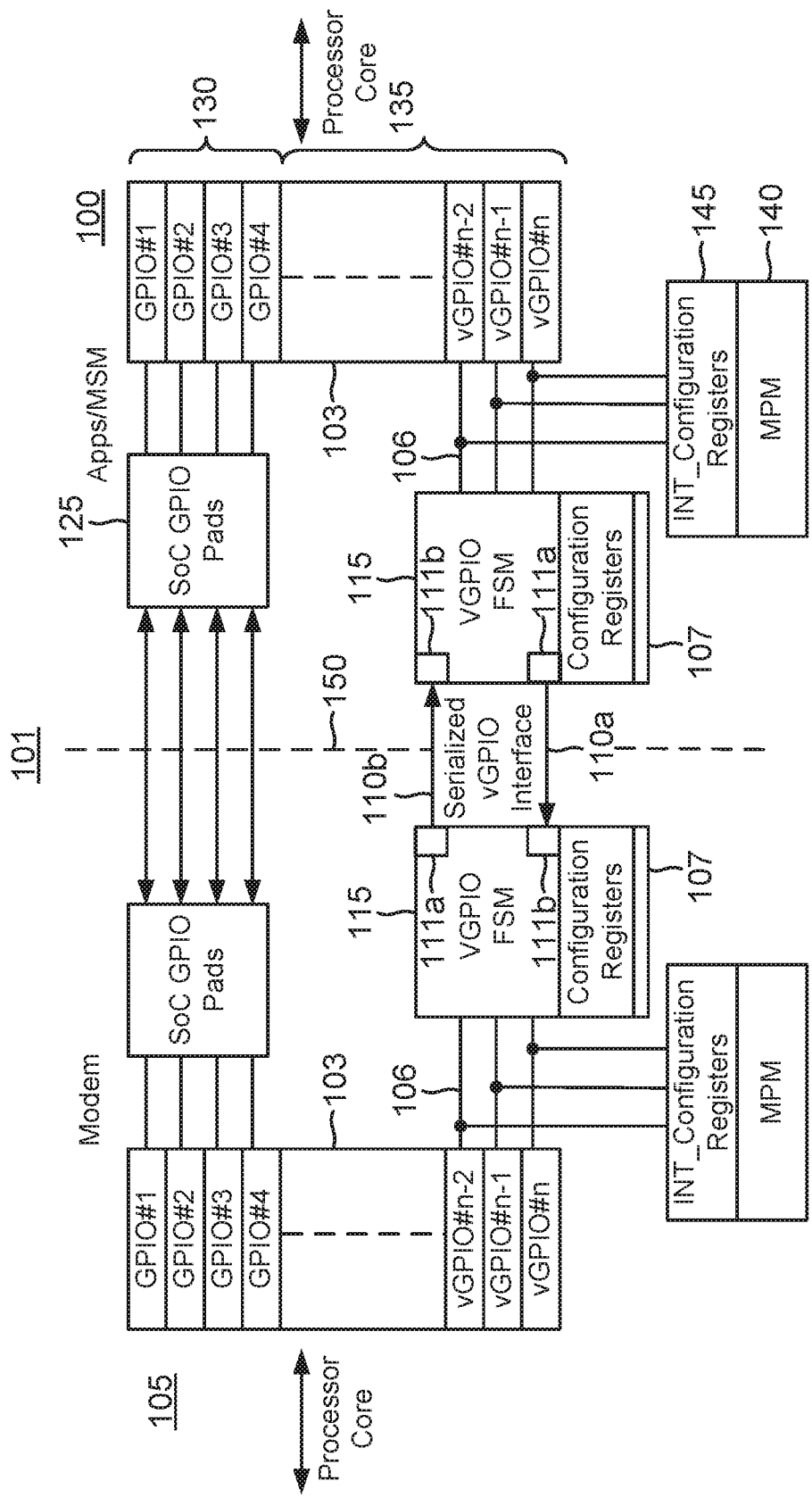
FIG. 1 is a block diagram of a system including a clockless virtual GPIO interface in accordance with an embodiment of the disclosure.

A serial interface is disclosed that serializes a plurality of signals into a frame in which each signal has its own unique position in the frame. For example, an eight-bit frame may be considered to be arranged from a first bit through an eighth bit. A first signal is defined through the binary value of the first bit, a second signal is defined through the binary value of the second bit, and so on such that a signal in a received frame may be identified through its position in the frame. In alternative embodiments, one or more of the signals may comprise a multi-bit signal. But such multi-bit signals are also assigned to unique positions within a frame.

Given such unique positioning within a frame, a receiver may identify a given signal within the frame by its unique position. For example, the first bit in an frame may be assigned to a first one-bit signal. Similarly, the second bit in a frame may be assigned to second one-bit signal, and so on such that the nth bit in a frame may be assigned to an nth one-bit signal, where n is a positive integer. The extension of such unique positioning to multi-bit signals is analogous. For example, an eight-bit signal may be assigned to the first byte of a frame, and so on. Given the identification of signals by their position within a frame, a serial interface that may be readily modified to practice the latency reduction disclosed herein is a virtual general purpose input output (GPIO) interface such as disclosed in commonly-assigned U.S. application Ser. No. 14/540,366, (the "366 application") filed Nov. 13, 2014, the contents of which is incorporated by reference. However, any serial interface that transmits serial data in a unique order such as practiced in a universal asynchronous receiver transmitter (UART) interface, a peripheral component interface (PCI), and an inter-integrated circuit (I2C) interface. The following discussion will thus be directed to a virtual GPIO (VGI) embodiment without loss of generality in that it will be appreciated that any serial interface may be modified as discussed herein to practice latency reduction.

An integrated circuit with a VGI interface uses a pair of pins as if they constituted a larger plurality of GPIO pins. This architecture is deemed virtual in that, to the system-level applications creating the signals for transmission as virtual GPIO signals through a virtual GPIO interface within the architecture, it is as if the virtual GPIO signals were being transmitted and received on conventional GPIO pins. A system on chip (SOC) or processor having a VGI interface thus experiences no functional difference between conventional GPIO signals and virtual GPIO signals. This is advantageous in that the processor needs no new configuration or programming to function with the VGI interface. However, the VGI interface uses only two pins to transmit and receive the virtual GPIO signals that would otherwise each need their own dedicated GPIO pin should they instead be transmitted as conventional GPIO signals.

This architecture will be discussed with regard to accommodating inter-processor communication (IPC) such as between an applications processor and a modem processor. However, it will be appreciated that the VGI interfaces disclosed herein are widely applicable to other SOCs or application specific integrated circuits (ASICs) requiring GPIO capabilities. In addition, a serial interface for control of a radio front-end may be advantageously modified to practice the latency reduction disclosed herein.

A VGI interface makes the health of the transmitting node transparent to the receiving node. This is an important advantage, particularly during the debugging stage for software implementations as it indicates to the receiving processor the time that a transmitting processor became inoperative.

To enable such a robust virtual GPIO capability, each processor in the transmitting and receiving integrated circuits communicates through a dedicated transmit pin coupled to a transmit line and a dedicated receive pin coupled to a receive line. The transmit line for a transmitting integrated circuit becomes the receive line for a receiving integrated circuit. The virtual GPIO signals may be divided into a transmit set for transmission over the transmit line and a receive set for reception on the receive line. If the signaling is symmetric, the number of signals in the transmit set and the receive set for each processor is the same. However, the virtual GPIO architecture disclosed herein can accommodate asymmetric signaling in which the transmit set of virtual GPIO signals for one processor is not the same size as the receive set for the same processor.

In one embodiment, the transmitting and receiving VGI interfaces may each receive an external clock signal to synchronize the transmission and reception of VGI frames. But the receipt of an external clock requires a clock pin. To eliminate the need for a clock pin, each VGI interface may include an oversampling clock such as a 16 times (16×) oversampling clock as used in a UART interface. In an alternative embodiment, each integrated circuit pulse-width modulates its transmit set of virtual GPIO signals into data frames for transmission to another integrated circuit. Each bit in the data frame corresponds to a bit in the transmit set of signals. Control of the pulse width modulation may be performed by a finite state machine (FSM). Each transmitted bit in a data frame is represented by a voltage pulse on the transmit line within a bit period. A first pulse width signifies one binary value for the transmitted bit whereas a second pulse width signifies another binary value for the transmitted bit. For example, one pulse width may be more than 50% of the bit period (a majority fraction of the bit period). Similarly, a remaining second pulse width may be less than 50% of the bit period (a minority fraction of the bit period).

To perform the pulse-width modulation, each FSM may include or be associated with an oscillator such as a ring oscillator and one or more counters for counting the oscillations of the oscillator. At the beginning of a bit period, the counter begins counting the number of oscillations prior to the pulsing of the transmit pin/transmit line. Depending upon the pulse width for the transmitted pulse, the counter counts to either a first count or a second count that is greater than the first count. Upon completion of selected count (which depends upon the binary value for the transmitted bit), the FSM pulses the transmit line. For example, each processor may be configured to weakly charge its transmit line to a power supply voltage VDD when idle (no data frames being transmitted). Discharging the transmit line would then indicate the start of a transmitted bit in such an embodiment. More generally, each transmit line would be maintained in some default voltage state, which may be referred to as a first binary voltage. The start of a transmitted bit would then be identified by charging (or discharging) the transmit line to a second binary voltage. Depending upon the binary value of the corresponding bit in the transmit set, the FSM then maintains the transmit line at the second binary voltage for either the majority of the bit period or the minority of the bit period. In particular, if the corresponding bit in the transmit set has a first binary value, the counter counts to the first count. Conversely, if the corresponding bit in the transmit set has an opposite second binary value, the counter counts to the second count.

In one embodiment, the second binary value is a logical zero whereas the first binary value is a logical one. Similarly, the first binary voltage may equal the power supply voltage VDD whereas the second binary voltage may equal ground. In such an embodiment, the FSM then serially examines each bit in the transmit set and based upon their binary values, either pulses the transmit line with a relatively wide pulse or a relatively narrow pulse for each bit. The receiving FSM can then demodulate a received frame of data by determining the pulse widths. This determination may be performed on a bit-by-bit basis by counting the number of oscillations that occur while the receive line is discharged versus the number of oscillations that occur while the receive line is pulsed to the power supply voltage VDD.

Given this resulting pulse-width modulation and de-modulation for each frame of data sent from one processor to another, the integrated circuits require no common clock such that the transmission of a frame of data from one integrated circuit is entirely asynchronous with regard to its receipt at a remote integrated circuit. Since there need be no common clock, there is thus no need for a clock pin in each integrated circuit to receive the common clock. This then frees up the pin that might otherwise be preserved for the common clock for other uses. These advantageous features may be better appreciated by the following discussion of example embodiments.

Turning now to the drawings, FIG. 1 illustrates a VGI architecture 101 that includes an application processor 100 and a modem processor 105. It will be appreciated, however, that other types of processors may be used within architecture 101. A transmit line 110a for transmitting virtual GPIO signals as IPC signals from application processor 100 over a transmit pin 111a is also the receive line for receiving these signals at modem processor 105 on a receive pin 111b. Similarly, a transmit line 110b for modem processor 105 for transmitting its IPC signals as virtual GPIO signals is also the receive line for application processor 100. These lines may be carried on a circuit board between the integrated circuits as indicated by dashed line 150. Each processor includes a transmit pin or pad (not illustrated) to couple to its transmit line. Similarly, each processor includes a receive pin or pad (not illustrated) to couple to its receive line. A finite state machine (FSM) 115 in each processor controls the transmission and reception of the virtual GPIO signals using these dedicated lines and pins.

As known in the GPIO arts, each processor includes a GPIO interface 103 over which it interfaces with GPIO pins. Advantageously, GPIO interface 103 may be unchanged with regard to the corresponding processor in virtual GPIO architecture 101. In other words, each processor receives and transmits signals through its GPIO interface 103 in a conventional manner such that virtual GPIO architecture 101 is transparent to processors 100 and 105. A certain portion of the signals processed through each GPIO interface 103 may be transmitted and received on conventional GPIO pins 125 as GPIO signals 130. But a remaining portion of the signals processed through GPIO interface 103 are not transmitted or received through conventional GPIO pins or pads 125. Instead, this remaining portion of the signals processed through GPIO interface 103 comprise a plurality of virtual GPIO signals 135 that are transmitted from FSM 115 over the dedicated transmit pin (or pad) 111a and received on the dedicated receive pin (or pad) 111b. The portion of the signals received at a GPIO interface 103 from the corresponding processor that are processed as conventional GPIO signals 130 may be denoted herein as a first set of signals. Similarly, the remaining portion of the signals received at a GPIO interface 103 from the corresponding processor that are processed as virtual GPIO signals 135 may be denoted herein as a second set of signals. In contrast to conventional GPIO signals 130, each virtual GPIO signal 135 does have its own dedicated pin but instead is multiplexed with the remaining virtual GPIO signals 135 on pins 111a and 111b. This is quite advantageous in that each processor core requires no retooling of its GPIO interface 103 yet virtual GPIO architecture 101 achieves a significant reduction of pins as compared to a conventional GPIO embodiment in which virtual GPIO signals 135 would each require their own pin.

Figure 2:
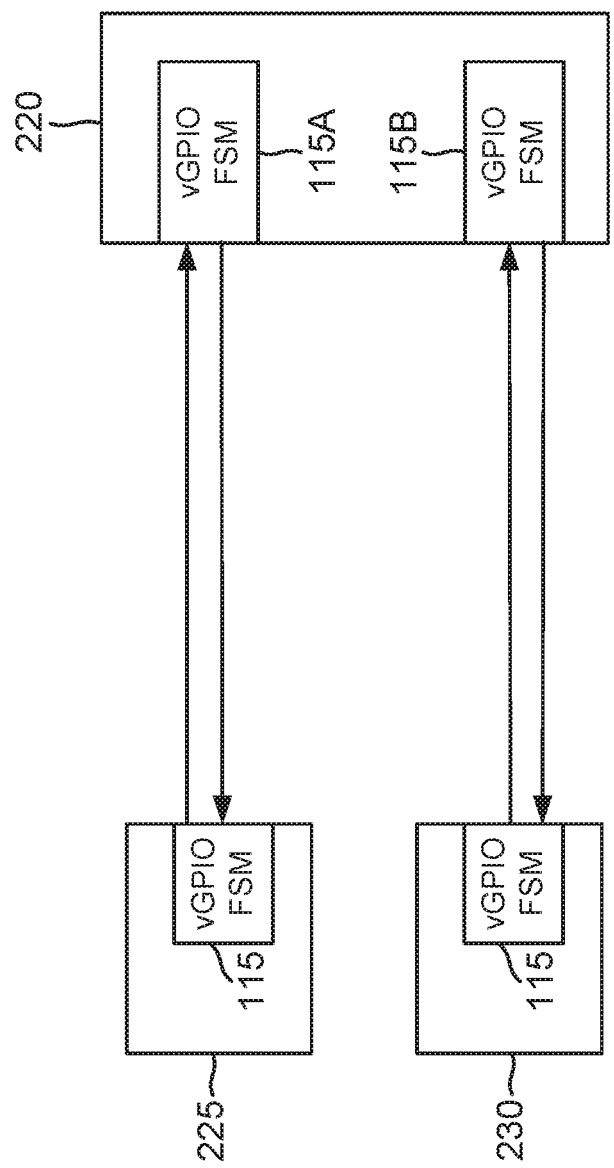
FIG. 2 is a high-level diagram for a virtual GPIO architecture in which a processor includes a pair of clockless virtual GPIO interfaces for communicating with two remote processors.

An integrated circuit such as processor 100 or modem 105 may include just one FSM 115 or may include a plurality of these elements for interfacing with multiple external systems. For example, FIG. 2 shows an application processor 220 interfacing with two modem processors 225 and 230 through two FSMs 115A and 115B, respectively. Each FSM 115A and 115B in processor 220 accommodates the virtual GPIO signaling with a corresponding one of the modem processors. In that regard, an integrated circuit such as an SOC may be configured with as many FSMs as is necessary to accommodate virtual GPIO signaling with assorted external processors. Regardless of the number of FSMs a processor may have, each FSM communicates using its own dedicated transmit pin 111a and a dedicated receive pin 111b as discussed with regard to FIG. 1. Because virtual GPIO signals 135 are accommodated using a finite state machine such as FSM 115, the processor cores may be asleep or in other types of dormant states yet be able to receive virtual GPIO signals 135. In this fashion, virtual GPIO architecture 101 not only advantageously economizes the number of pins for each GPIO interface 103 but is also low power.

As used herein, "pin" is a generic term to cover the structure such as a pad or an actual pin that an integrated circuit uses to couple to leads on circuit board or other physical interconnect (e.g., package interconnect or through-hole via interconnect). For example, if each integrated circuit has sixteen GPIO pins 125, then these pins could be configured to accommodate eight symmetric GPIO signals 130 (for illustration clarity, only four conventional GPIO signals #1 through #4 are shown in FIG. 1) or sixteen asymmetric GPIO signals 130. In addition, each integrated circuit can accommodate the input/output interfacing of a plurality of n virtual GPIO signals 135 using its transmit pin 111a and receive pin 111b, wherein n is an arbitrary plural integer. With regard to each processor core, there is no difference between GPIO signals 130 and virtual GPIO signals 135: they are both simply signals that are transmitted and received as necessary through GPIO interface 103. However, since virtual GPIO signals 135 do not have dedicated pins in contrast to conventional GPIO signals 130, virtual GPIO signals 135 are serialized in FSMs 115 for transmission on lines 110a and 110b. Upon reception, each FSM 115 deserializer the received serialized virtual GPIO signals. Thus, each FSM 115 functions as a serializer/deserializer with regard to virtual GPIO signals 135.

To identify the presence of received virtual GPIO signals 135 as transmitted from a remote processor, each processor may be configured to receive an interrupt signal in response to changes in selected ones of virtual GPIO signals 135. To provide the interrupt, a modem power manager (MPM) 140 monitors the selected virtual GPIO signals as programmed through interrupt (INT_configuration) registers 145. If MPM 140 sees a monitored signal change, it transmits an interrupt to its processor accordingly. With regard to transmission, each FSM 115 modulates the virtual GPIO signals 135 generated by its processor through the processor's interaction with the corresponding GPIO interface 103 into a pulse-width-modulated signal that is transmitted over transmit line 110a. Similarly, each FSM 115 receives a pulse-width-modulated signal on its receive line 110b from a remote processor. This pulse transmission is quite advantageous in that it enable asynchronous transmission (no common clock) between processors 100 and 105 as will be explained further herein.

Figure 3:
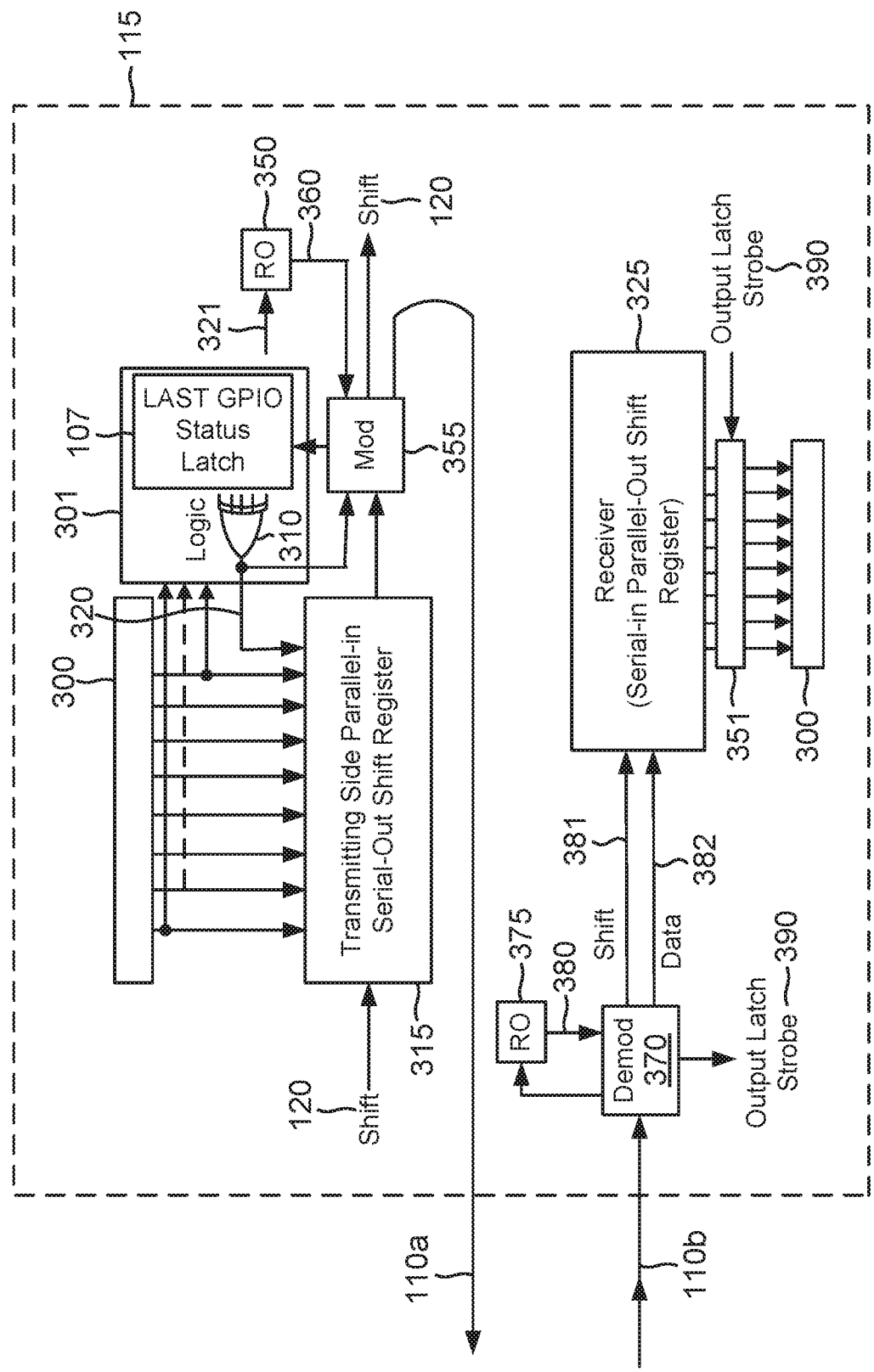
FIG. 3 is a block diagram for a finite state machine in the clockless virtual GPIO interface of FIG. 1.

FIG. 3 is a block diagram of an FSM 115 to better illustrate its transmit and receive operations. FSM 115 receives a transmit set of virtual GPIO signals from its GPIO interface 103 (shown in FIG. 1) through a multiplexing module 300. This transmit set of virtual GPIO signals would conventionally be transmitted as ordinary GPIO signals 130 discussed with regard to FIG. 1 but are instead identified as virtual GPIO signals 135 by GPIO interface 103 and processed through FSM 115 accordingly. FSM 115 includes a logic circuit 301 that will authorize the transmission of the transmit set of virtual GPIO signals as a pulse-width modulated signal over transmit line 110a if there has been a change in the transmit set as compared to a previous state of the transmit set. In this fashion, there is no unnecessary re-transmission of a transmit set that has not changed state as compared to a previous transmission. Logic circuit 301 thus compares the current transmit set of virtual GPIO signals to the previous transmit set stored in a latch or configuration register 107. To perform the comparison, logic circuit 301 may include an XOR gate 310 that XORs the current transmit set with the previous transmit set stored in configuration register 107 (this previous transmit set may be designated as the "LAST GPIO Status" as shown in FIG. 2). Multiplexing module 300 loads the current transmit set in parallel into a parallel-in-serial-out (PISO) shift register 315. If an enable signal 320 from XOR gate 310 goes high (indicating a change between the current transmit set and that stored in register 107), PISO shift register 315 is then enabled to serially shift out its contents onto transmit line 110a responsive to a shift signal 120.

Each transmit set of virtual GPIO signals 135 from FIG. 1 comprises a frame of data that is stored in PISO shift register 315. FSM 115 includes a pulse-width modulator 355 that pulse-width modulates the transmit set of bits shifted out from PISO shift register 315 into a pulse-width-modulated output signal that is driven to the remote processor on transmit line 110a. This modulation is responsive to counts of oscillation cycles from an oscillator such as the counts of a transmit ring oscillator output signal 360 from a transmit ring oscillator (RO) 350. Modulator 355 and transmit ring oscillator 350 may be triggered by the assertion of enable signal 320 from XOR gate 310. Responsive to this triggering, modulator 355 strobes shift signal 120 so that PISO shift register 315 shifts an initial bit of the transmit set of virtual GPIO signals to modulator 355.

Modulator 355 includes at least one counter (not illustrated) that counts the cycles in ring oscillator output signal 360. Depending upon the desired pulse width from the pulse width modulation, the counter either counts to a first count or to a second count that is greater than the first count. After counting a sufficient number of cycles to satisfy the appropriate one of the first and second counts, the counter re-strobes shift signal 120 so that a subsequent bit from the frame of data stored in PISO shift register 315 is shifted into modulator 355. In this fashion, the transmit set of virtual GPIO signals 135 stored as a frame of data in PISO shift register 315 is shifted a bit at a time into modulator 355. Depending upon the binary value of each bit that is shifted out of PISO shift register 315, pulse-width modulator 355 pulse-width modulates a corresponding pulse transmitted over transmit line 110a. In that regard, processor 100 may be configured to weakly charge transmit line 110a high to a power supply voltage VDD during a default state (no data transmission).

FSM 115 also deserializer a receive set of virtual GPIO signals 135 in an analogous fashion using a serial-in-parallel-out (SIPO) shift register 325. A demodulator 370 demodulates a received pulse-width-modulated signal from a remote processor as received on receive line 110b. Demodulator 370 is configured to detect the start of a received frame of data from the received pulse-width-modulated signal such as by detecting the discharge of receive line 110b to trigger a receive ring oscillator 375 to begin oscillating a receive ring oscillator output signal 380. Note that in alternative embodiments, ring oscillators 350 and 380 may comprise the same oscillator. Analogous to modulator 355, demodulator 370 may include a counter (not illustrated) such as a low counter and a high counter. In each bit period, the low counter is triggered to count while receive line 110b is discharged. Conversely, the high counter is triggered to count while receive line 110b is charged to the power supply voltage VDD. In alternative embodiments, a single common counter may count the number of oscillations in each binary voltage state for receive line 110b. By comparing the low and high counts, demodulator 370 may form a demodulated data signal 382 accordingly. In particular, if the high count is greater than the low count in a given bit period, demodulator 370 may drive demodulated data signal 382 high to the power supply voltage VDD to signify that a relatively wide pulse was received. Conversely, if the low count is greater, demodulator 370 may discharge demodulated data signal 382 to VSS to signify that a relatively narrow pulse was received.

Demodulator 370 may also assert a shift signal 381 to SIPO shift register 325 upon detection from the counts of the bit time period boundaries. SIPO shift register 325 would then shift in demodulated data signal 382 from demodulator 370. SIPO shift register 325 may provide a complete frame of virtual GPIO data in parallel to an output latch 351 responsive to an output latch strobe signal 390. FSM module 115 may be configured to process a predefined data frame size for the transmit and receive sets of virtual GPIO signals—for example, each set may comprise a plurality n of virtual GPIO signals. The n virtual GPIO signals are transmitted and received in a frame with respect to a start bit and a stop bit. FSM 115 is readily programmed to alter this predefined set size as necessary for a given design. The start bit is the initial bit in a data frame. The stop bit is the final bit in a data frame and may be followed by an additional discharge fraction of the bit period. Output latch strobe signal 390 may thus be asserted responsive to detecting that the stop bit has been shifted into SIPO shift register 325. The resulting frame of virtual GPIO data stored in output latch 351 may be presented in parallel to multiplexing module 300 so that it may be transferred to GPIO interface 103 (FIG. 1). Additional details for the pulse width modulation are discussed in the '366 application.

Regardless of whether an external clock is used, or an oversampling clock, or a pulse-width modulation scheme as discussed with regard to FIG. 3, note the difference between a conventional GPIO signal and a VGI signal as transmitted over dedicated transmit pin 110a. In particular, a conventional GPIO signal is identified through its receipt on a corresponding one of conventional GPIO pins 125. In contrast, FSM 115 identifies a VGI signal in a VGI frame though its position in the frame. For example, if the payload size for a VGI frame is eight bits arranged from a first bit through a last bit, there would be eight different bit positions in the VGI frame payload. Both the transmitting and receiving FSM 115 may thus be configured with the information of which bit position corresponds to which VGI signal. Given this identify of a VGI signal by its position within the frame, the following latency reduction technique is readily implemented.

Figure 4:
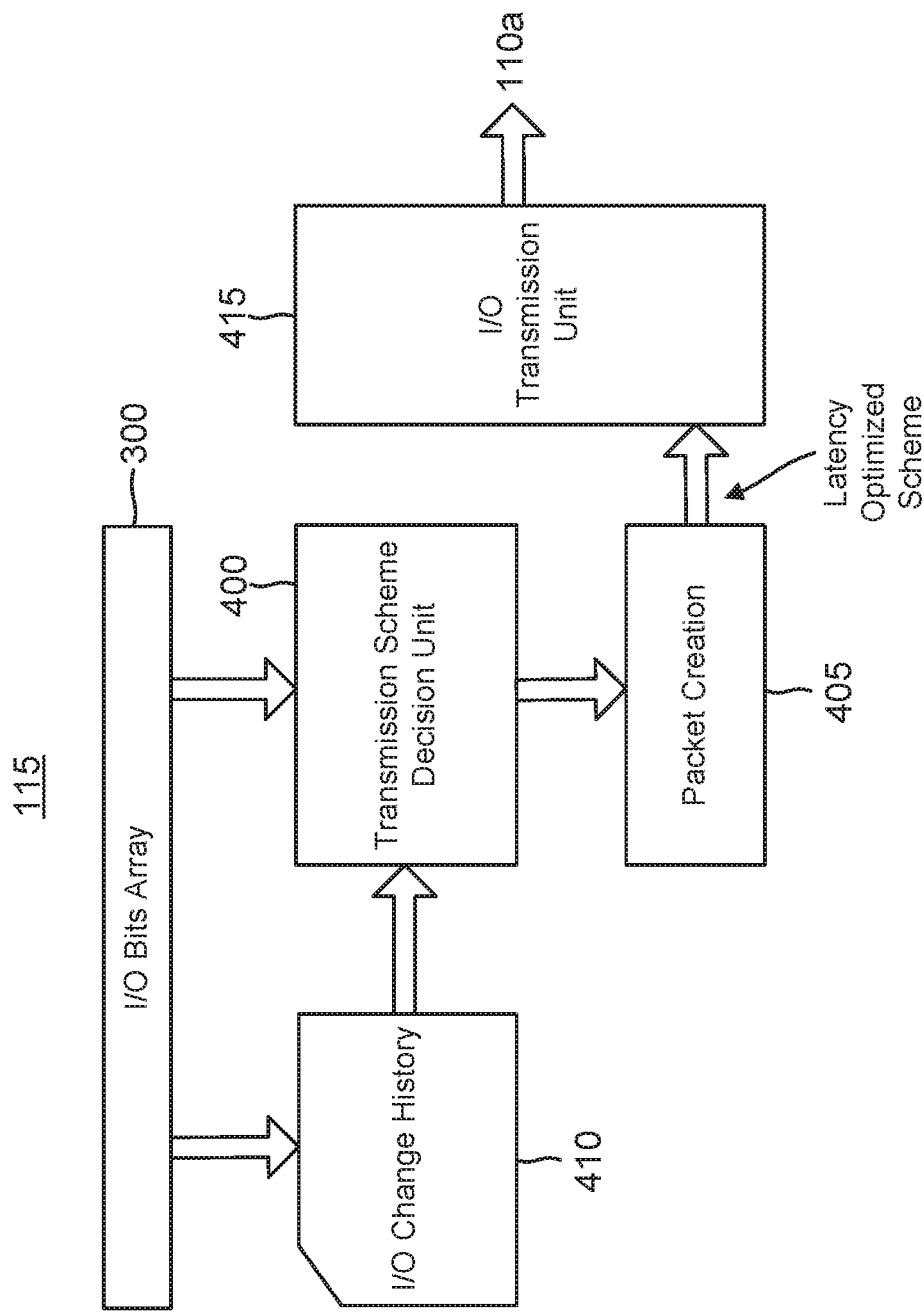
FIG. 4 illustrates logic circuits within the finite state machine of FIG. 3.

An FSM 115 may be configured as shown in FIG. 4 to include a transmission scheme decision logic circuit 400 and a packet creation logic circuit 405 that together are configured to reduce latency by selecting an appropriate frame type such as a batch-mode frame or a bit-mode frame. It will be appreciated that an analogous FSM may be implemented in any suitable serial interface such as the UART, PCI, and I2C interfaces noted above. A memory 410 such as a register stores the previously-transmitted frame. For example, memory 410 may be coupled to multiplexing module 300 to receive the payload for a current frame. This payload is stored in memory 410 and becomes the subsequent payload when a subsequent payload is ready to launched from multiplexing module 300 as the subsequent current frame. Transmission scheme decision logic circuit 400 is configured to compare the current payload as received from multiplexing module 300 to the previous payload as received from memory 410 to determine the number of changed bits. Based upon the decision from transmission scheme decision logic circuit 400, a packet creation circuit 405 forms a packet (frame) based upon the appropriate frame type as selected by transmission scheme decision logic circuit 400. Packet creation circuit 405 may append a header to the resulting frame to identify the frame type. An I/O transmission circuit 415 (e.g., PISO shift register 315 of FIG. 3) may then transmit the selected packet over transmit pin 110a.

Figure 5:
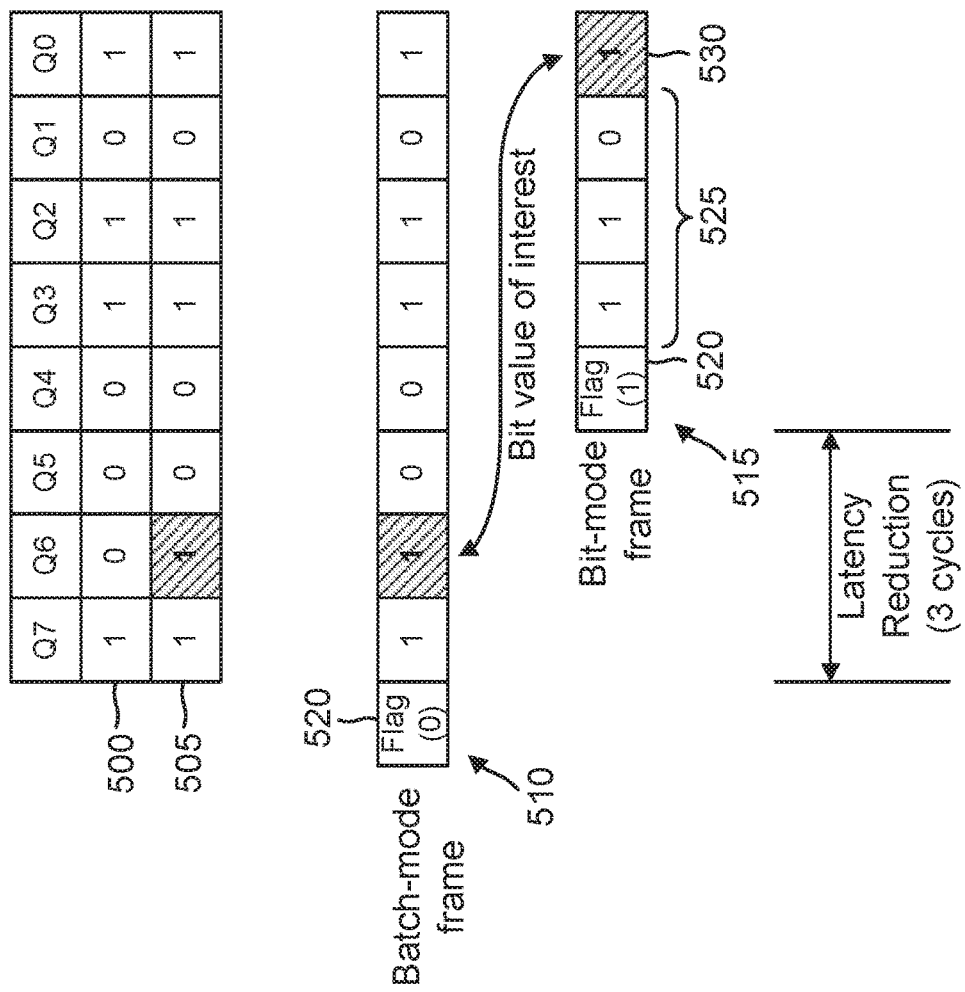
FIG. 5 is a conceptual diagram illustrating the latency improvement for a bit-mode frame as compared to a batch-mode frame for the transmission of an eight one-bit signals.

The logic performed by transmission scheme decision logic circuit 400 may be better understood with reference to FIG. 5 for an embodiment in which the payload size is eight bits arranged from a VGI signal Q0 through a bit Q7. Each signal has its own corresponding bit position in a frame. In a previous payload 500, signals Q7, Q3, Q2, and Q0 were all binary ones whereas signals Q6, Q5, Q4, and Q1 were binary zeroes. These values remained unchanged in a current payload 505 except for signal Q6, which changed to a binary one. Should transmission scheme decision logic circuit 400 (FIG. 4) elect to transmit current payload 505 in a batch-mode frame 510, all the bits Q7 through Q0 are transmitted in their respective bit positions. Batch-mode frame 510 includes a header 520 (which may also be designated as a flag) that identifies batch-mode frame 510 as a batch-mode frame through a binary value of zero. Each bit in batch-mode frame 510 requires a certain amount of time for its transmission, which may be denoted as the bit period. The serial transmission of batch-mode frame 510 would thus require nine bit periods to accommodate all the signals Q7 through Q0 as well as header 520.

Transmission scheme decision logic circuit 400 compares previous payload 500 to current payload 505 to determine the number of changed signals. Between payloads 500 and 505, it is only signal Q6 that has changed (from a binary zero in payload 500 to a binary one in payload 505). It will thus reduce latency for transmission scheme decision logic circuit 400 to instead select for a bit-mode frame 515 that merely identifies the bit position of the changed signal (in this case, signal Q6) through an address 525 of the bit position and a binary value 530 of the changed signal. A header 520 for bit-mode frame 515 identifies it as a bit-mode frame type by having a binary value of one. It will be appreciated that the actual binary value (and number of bits) of an appropriate header for batch-mode frame 510 and bit-mode frame 515 may be varied in alternative embodiments.

For address 525 to identify the bit position for eight bits Q0 through Q78 uses three address bits. Header 520 and binary value 530 are each one bit so the total number of bit periods for a serial transmission of bit-mode frame 515 is five. The selection of bit-mode frame 515 instead of the selection of batch-mode frame 510 by transmission scheme decision logic circuit 400 will thus reduce the latency for the serial transmission of the payload by three bit periods (a latency reduction of 37.5%). A receiving FSM 115 (FIG. 4) is configured to analyze header 520 to identify the frame type. If a bit-mode frame type is identified, the receiving FSM 115 assigns the unchanged signals to have the same values as stored in memory 410. Multiplexing module 300 (FIG. 3) may then be loaded with the unchanged signals and changed signal 530 so that the resulting payload may be presented to GPIO interface 103 of FIG. 1 as a current payload of virtual GPIO signals. In an alternative embodiment, binary value 530 may be omitted from bit-mode frame 515 to further reduce latency in that the receiving FSM may simply invert the stored value of the signal identified by address 525 to recover binary value 530.

Figure 6:
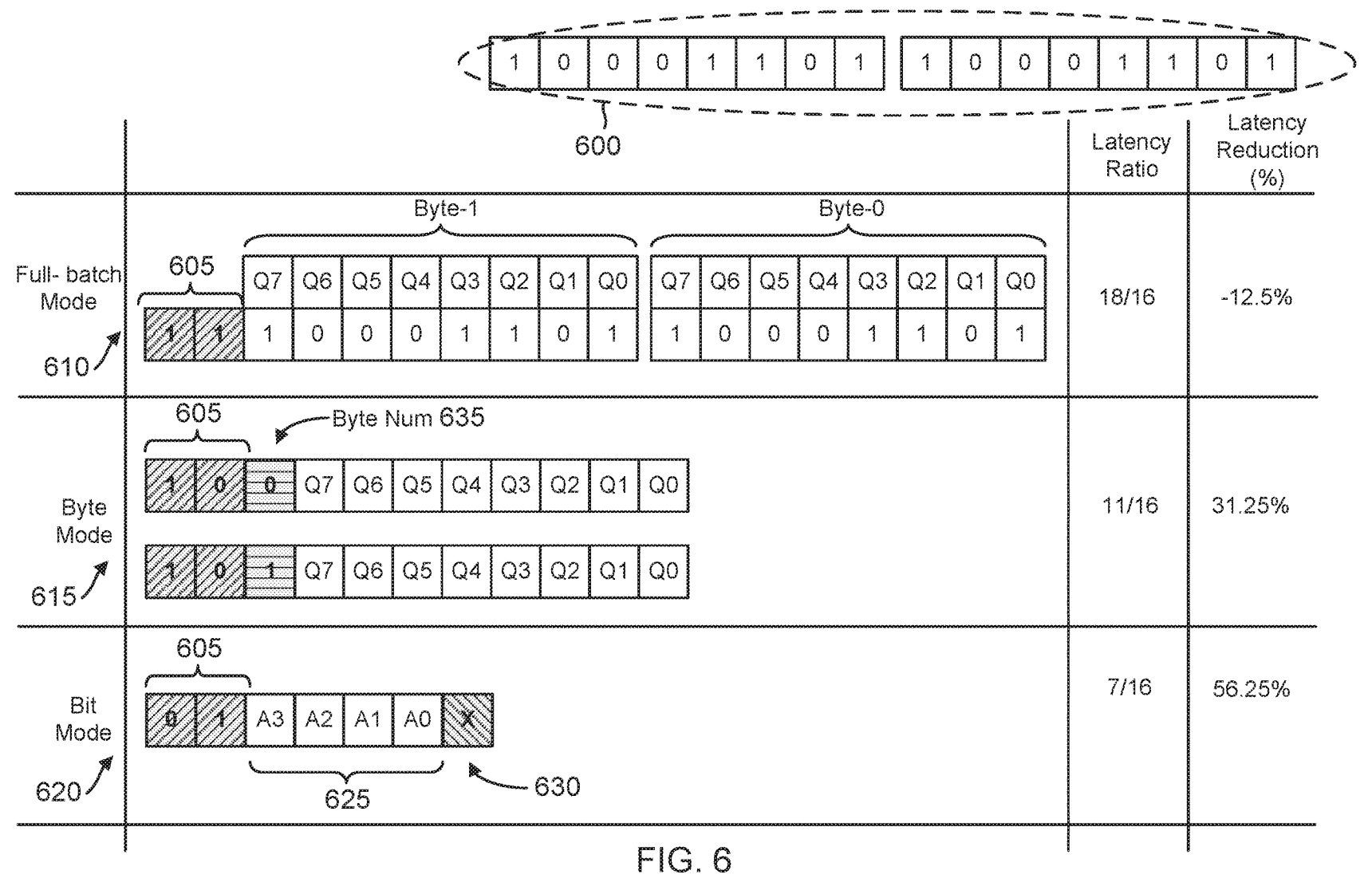

Note that the threshold used by transmission scheme decision logic circuit 400 with regard to the number of changed signals 530 will depend upon the payload size. In a byte payload embodiment such as shown in FIG. 5, if two bits are changed, a bit-mode frame type will not reduce latency as each changed bit requires 3 address bits to identify its bit position and potentially another bit to identify the changed binary value. Transmission scheme decision logic circuit 400 may thus be configured in a byte payload embodiment to select for a batch-mode frame type if more than one bit has changed in current payload 505. But the threshold changes if the payload size increases. For example, a payload 600 of two bytes is shown in FIG. 6. Given the increased size for payload 600, another frame type is introduced denoted as a byte-mode frame type in addition to the batch-mode and bit-mode frame types. To identify the three different frame types, a header 605 may comprises two bits. A full-batch mode 610 includes entire payload 600. With the combination of payload 600, full-batch mode 610 thus requires eighteen bit periods for its serial transmission such that the latency reduction compared to the original payload latency of sixteen bit periods is −12.5%. Full-batch mode 610 is favored if each byte in payload 600 has one or more changed bits. If only one of the bytes has changed and that change is greater than one bit, a byte-mode frame 615 is favored in which the changed byte is transmitted in a byte-mode of transmission. Byte-mode frame 615 includes a byte number flag 635 to identify which byte is being transmitted in full. The receiving FSM 115 (FIG. 4) would then assign the unchanged byte to have the values for that byte stored in memory 410. Byte-mode frame 615 uses eleven bit periods for its serial transmission such that the latency reduction with regard to payload 600 is 31.25%. Finally, a bit-mode frame 620 is favored if only one bit in one of the bytes in payload 600 has changed. To identify the bit position in a two-byte payload uses four address bits 625. A binary value 630 for the changed bit is optional in that the stored value at the corresponding bit position in memory 410 may simply be inverted to recover binary value 630 as discussed analogously with regard to bit-mode frame 515. Byte-mode frame 615 may readily be extended to larger payloads by modifying byte number 635 accordingly.

Figure 7:
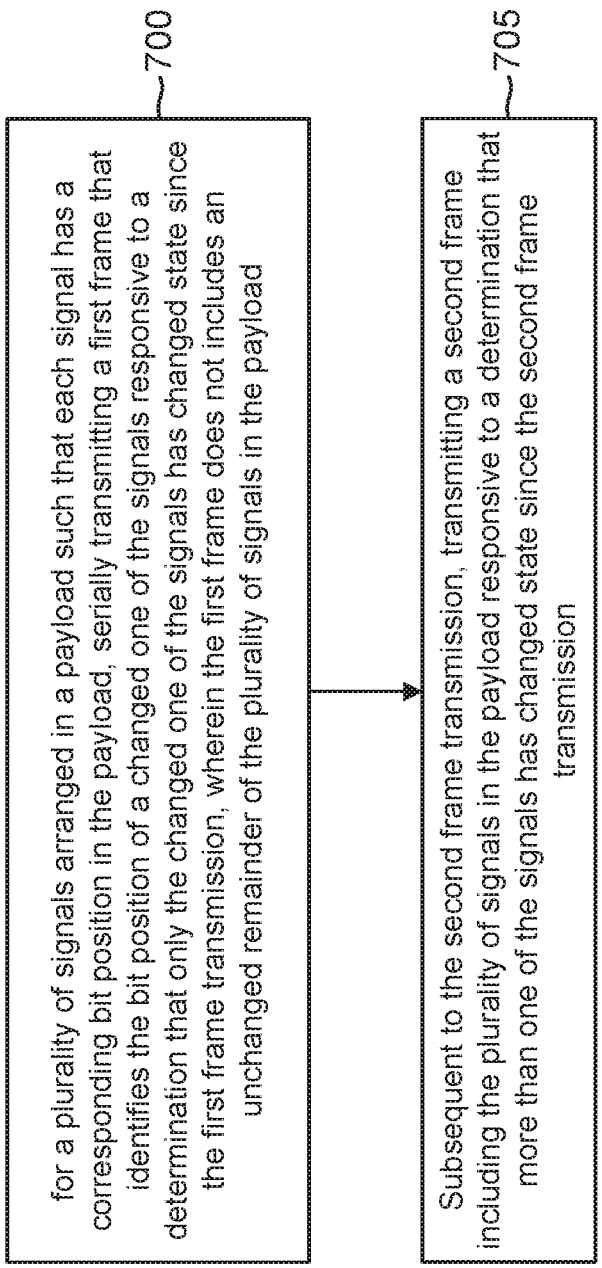
FIG. 7 is a flowchart for an example method of optimizing latency for a serial transmission.

A method of operation for an FSM such as FSM 115 will now be discussed with regard to the flowchart shown in FIG. 7. The method includes an act 700 for a plurality of signals arranged in a payload such that each signal has a corresponding bit position in the payload. An example of such a payload includes payload 500 and 505 of FIG. 5 and payload 600 of FIG. 6. Act 700 includes serially transmitting a first frame that identifies the bit position of a changed one of the signals in the payload responsive to a determination that only the changed one of the signals has changed state since the first frame transmission, wherein the first frame does not includes an unchanged remainder of the plurality of signals in the payload. An example of such a first frame transmission is discussed above with regard to bit-mode frame 515 of FIG. 5 or bit-mode frame 620 of FIG. 6.

In addition, the method includes an act 705 that occurs subsequent to the second frame transmission and comprises transmitting a second frame including the plurality of signals in the payload responsive to a determination that more than one of the signals has changed state since the first frame transmission. An example of the second frame transmission is discussed above with regard to batch-mode frame 510 of FIG. 5 and batch-mode frame 610 of FIG. 6.

Figure 8:
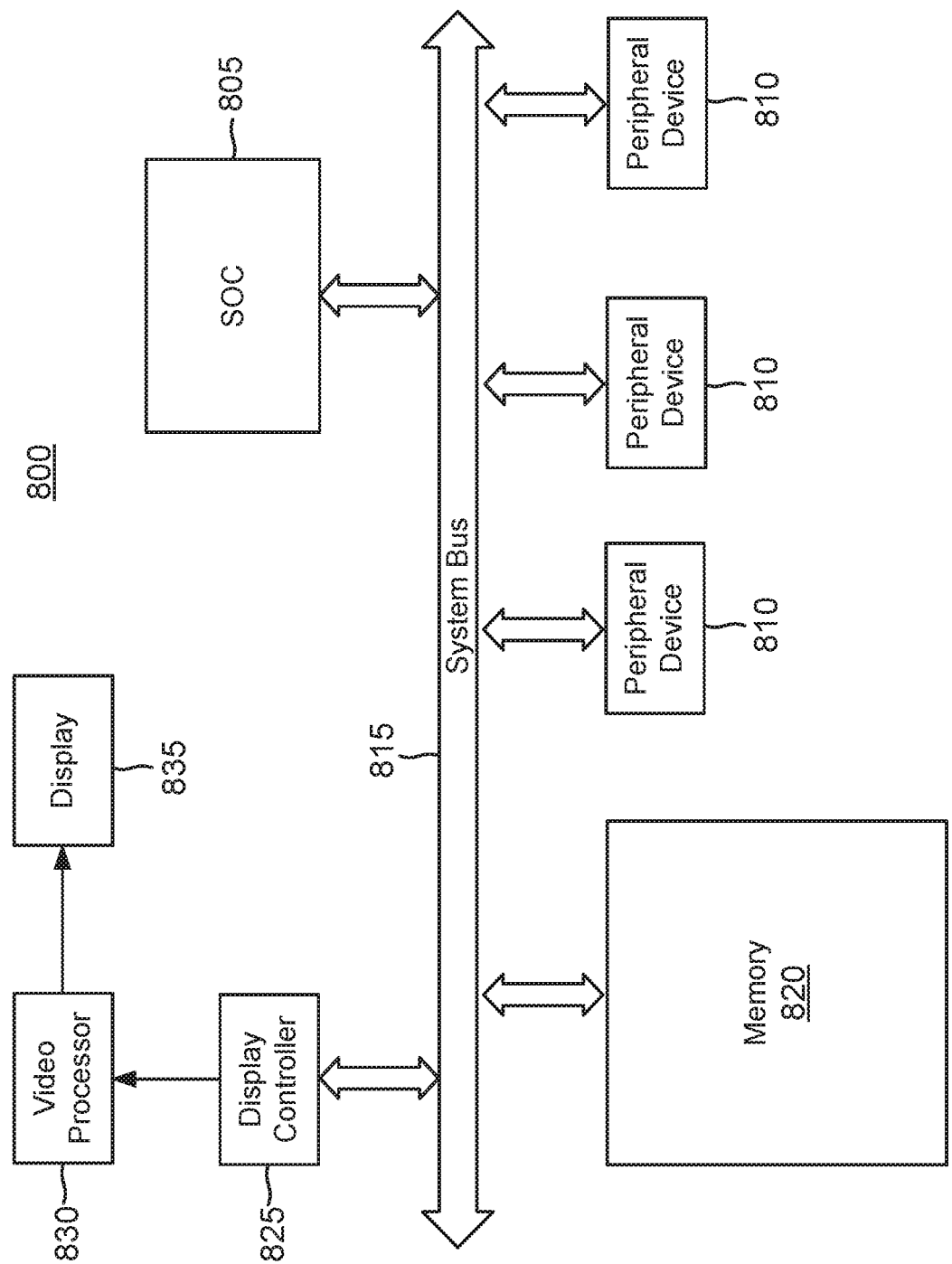
FIG. 8 illustrates a system incorporating the SoC and remote processor of FIG. 1.

An example system 800 is shown in FIG. 8 in which a system-on-a-chip (SOC) 805 is configured with an FSM (not illustrated) such as FSM 115 discussed above for optimizing the latency of serial communication with a plurality of peripheral devices 810. Each peripheral device 810 thus also includes a corresponding FSM as well. The corresponding two-wire link between SOC 805 and each peripheral device 810 is also not shown for illustration clarity but contained within a system bus 815. System 800 may comprise a cellular phone, smart phone, personal digital assistant, tablet computer, laptop computer, digital camera, handheld gaming device, or other suitable device. In addition to communicating with peripheral devices 810, SoC 805 also communicates through system bus 815 with a memory such as a DRAM 820 and a display controller 825. Display controller 825 in turn couples to a video processor 830 that drives a display 835.

Although the preceding discussion was directed to VGI embodiments, it will be appreciated that FSM 115 may be readily modified to implement the disclosed latency reduction for any suitable serial interface such as UART, PCI, I2C, and so on. As those of some skill in this art will by now appreciate and depending on the particular application at hand, many modifications, substitutions and variations can thus be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A method, comprising:
   for a plurality of signals arranged in a payload such that each signal has a corresponding bit position in the payload, serially transmitting a first frame that identifies the bit position of a changed one of the signals in the payload responsive to a determination that only the changed one of the signals has changed state since the first frame transmission, wherein the first frame does not includes an unchanged remainder of the plurality of signals in the payload; and
   subsequent to the second frame transmission, serially transmitting a second frame including the plurality of signals in the payload responsive to a determination that more than one of the signals has changed state since the first frame transmission.

2. The method of claim 1, wherein serially transmitting the first frame includes serially transmitting a first header and wherein serially transmitting the second frame includes serially transmitting a second header.

3. The method of claim 1, further comprising:
   at a general purpose input output (GPIO) interface, receiving a first set of signals from a processor and receiving a second set of GPIO signals from the processor;
   from the GPIO interface, transmitting the second set of GPIO signals through corresponding GPIO pins to a remote processor; and
   from the GPIO interface, providing in parallel the second set of GPIO signals to a finite state machine (FSM), wherein the second set of GPIO signals comprises the plurality of signals in the payload prior to the transmission of the first frame.

4. The method of claim 3, further comprising:
   storing the second set of GPIO signals in a memory;
   after the transmission of the first frame, receiving a third set of GPIO signals from the processor at the GPIO interface;
   comparing the third set of GPIO signals to the stored second set of GPIO signals to determine that more than one of the GPIO signals has changed state since the transmission of the first frame, wherein serially transmitting the second frame comprises serially transmitting the third set of GPIO signals.

5. The method of claim 3, wherein the serially transmitting the first frame and the second frame is not responsive to an external clock.

6. The method of claim 4, wherein serially transmitting the third set of GPIO signals comprises:
   pulse-width-modulating the third set of signals from the GPIO interface into a corresponding series of pulse-width-modulated signals; and
   serially transmitting the series of pulse-width-modulated signals through a dedicated transmit pin to the remote processor.

7. The method of claim 1, wherein the payload comprises a byte payload.

8. An integrated circuit, comprising:
   a processor configured to periodically generate a plurality of signals arranged in a payload from a first signal to a last signal such that each signal in the plurality of signals has a corresponding bit position in the payload;
   a memory configured to store the plurality of signals from each periodic generation by the processor; and
   a finite state machine (FSM) configured to compare a current state for the plurality of signals to a previous state for the plurality of signals as retrieved from the memory to determine if only a single one of signals in the current state has changed state compared to the previous state, the FSM being further configured to serially transmit a first frame to a remote processor that identifies an address for the bit position of the single changed signal responsive to the determination that only the single changed signal has changed state.

9. The integrated circuit of claim 8, wherein the FSM is further configured to compare the current state for the plurality of signals to the previous state to determine if more than one of the signals in the current state has changed state compared to the previous state, the FSM being further configured to serially transmit a second frame that includes the plurality of signals to the remote processor responsive to the determination that more than one of the signals has changed state.

10. The integrated circuit of claim 8, wherein the plurality of signals comprises a plurality of first general purpose input output (GPIO) signals.

11. The integrated circuit of claim 10, further comprising:
    a dedicated transmit pin;
    a plurality of GPIO pins; and a GPIO interface, wherein the processor is configured to provide a plurality of second GPIO signals to the GPIO interface, and wherein the GPIO interface is configured to transmit the plurality of second GPIO signals to the remote processor through the plurality of GPIO pins, and wherein the FSM is further configured to serially transmit the plurality of first GPIO signals as a plurality of virtual GPIO signals over a dedicated transmit pin to the remote processor.

12. The integrated circuit of claim 9, wherein the FSM is further configured to serially transmit the first frame with a first header and to serially transmit the second frame with a second header.

13. The integrated circuit of claim 12, wherein the first header and the second header are both one-bit signals.

14. The integrated circuit of claim 9, wherein the plurality of signals comprises a pair of bytes, and wherein the FSM is further configured to compare the current state for the plurality of signals to the previous state to determine if only a changed one of the bytes has changed state compared to the previous state, and wherein the FSM is further configured to serially transmit only the changed byte in a third frame to the remote processor responsive to the determination that only the changed byte has changed state.

15. The integrated circuit of claim 11, wherein the FSM is further configured to serially transmit the plurality of virtual GPIO signals as a plurality of pulse-width-modulated signals.

16. The integrated circuit of claim 11, wherein the FSM is further configured to serially transmit the plurality of virtual GPIO signals responsive to cycles of an external clock.

17. The integrated circuit of claim 11, wherein the integrated circuit is included in a system selected from the group consisting of a cellular phone, a smart phone, a personal digital assistant, a tablet computer, a laptop computer, a digital camera, and a handheld gaming device.

18. A method, comprising:
periodically storing a state for a plurality of signals in a memory in a first integrated circuit, wherein the signals are ordered in a sequence from a first signal to a last signal so that each signal has a unique position in the sequence;
comparing a current state for the plurality of signals to a previous state for the plurality of signals as retrieved from the memory;
responsive to the comparison indicating that more than one of the signals has changed state in the current state, serially transmitting a first frame to a second integrated circuit, wherein the first frame comprises the plurality of signals ordered according to the sequence; and
responsive to the comparison indicating that only one of the signals has changed state in the current state and that a remainder of the signals have not changed state, serially transmitting a second frame to the second integrated circuit, wherein the second frame includes an address for the position of the changed signal and does not include the remainder of the signals.

19. The method of claim 18, wherein serially transmitting the second frame further comprises transmitting the changed signal.

20. The method of claim 18, further comprising attaching a first header to the first frame and a second header to the second frame, wherein the first header is different from the second header.

* * * * *